Jan. 20, 1953     A. H. MERRILL     2,625,750
PROBLEM TEACHING DEVICE USING ANSWER BLOCKS
Filed May 21, 1951
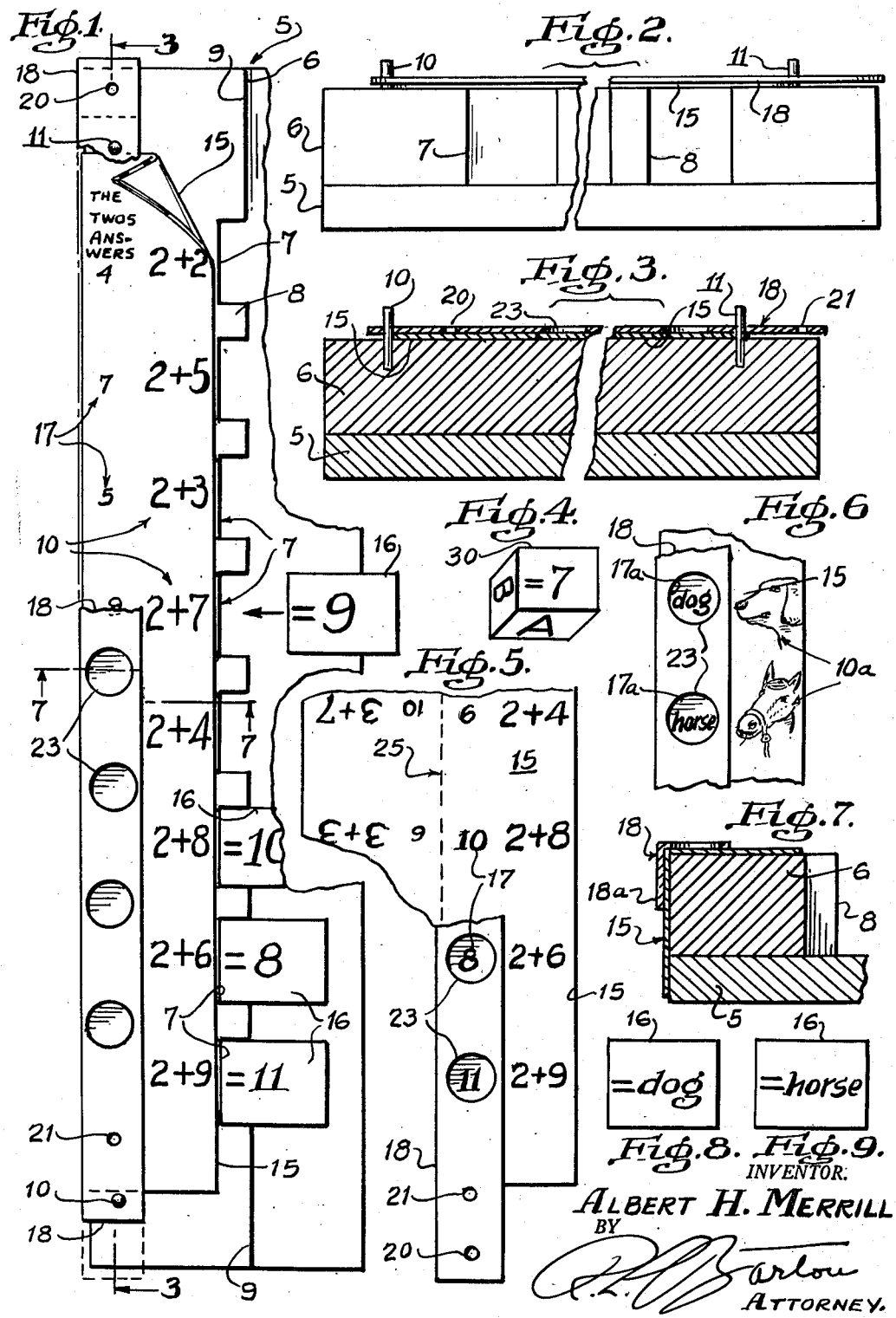
INVENTOR:
ALBERT H. MERRILL
BY
ATTORNEY.

Patented Jan. 20, 1953

2,625,750

UNITED STATES PATENT OFFICE 2,625,750

PROBLEM TEACHING DEVICE USING ANSWER BLOCKS

Albert H. Merrill, Los Angeles, Calif.

Application May 21, 1951, Serial No. 227,336

4 Claims. (Cl. 35—9)

This invention pertains to an educational device for children, and more particularly to a device which enables children to use blocks of the a—b—c and numeral bearing type in a more interesting and instructive manner.

An important object of the invention is to provide an educational device for the above stated kind wherein the answers to all the numerical problems of the addition, subtraction, multiplication and division tables may be presented in a convenient way and their answers inscribed upon so few a number of blocks that these rudiments of arithmetic may be taught by an apparatus of a compact character and inexpensive to manufacture.

The device comprises a member for supporting selected columns of problems in a position for having answer blocks juxtaposed to them, the answer to each problem being inscribed adjacent thereto, but being concealed by a cover member until after the attempted solution of the problem, whereupon said cover member is removed or placed in an unobstructing position in relation to the answer, to enable the child to check his answers.

The invention includes within its scope the teaching of other than arithmetical problems, being adapted among additional uses, for teaching the child to read the names of pictorially represented objects, both animal and inanimate.

Other objects, advantages, and features of invention will hereinafter appear.

Referring to the accompanying drawing, which illustrates a preferred, reduced to practice embodiment of the invention, Fig. 1 is a plan view of the device, parts of the baseboard being broken away to contract the view and a portion of the cover strip being broken out to disclose underlying structure. A plurality of the answer blocks are included in this view.

Fig. 2 is a fragmentary elevation showing only the end portions of the device, the observer looking from right to left in relation to Fig. 1.

Fig. 3 is a fragmentary cross section on line 3—3 of Fig. 1, showing only the end portions of the device.

Fig. 4 is a perspective view of one of the answer blocks.

Fig. 5 is a partial reproduction of structures shown in Fig. 1, the apertured cover strip being fragmentarily shown, shifted to the position wherein it discloses the answers to the problems. In this view the sheet which underlies the cover strip is partly shown in an expanded condition, so as to expose the entire width of part of one of the faces thereof.

Fig. 6 is a fragmentary plan view looking down upon a problem-and-answer sheet for teaching the names of animals, a fragment of the cover strip being shown, adjusted to the reading position.

Fig. 7 is a cross section on angular line 7—7 of Fig. 1.

Figs. 8 and 9 are plan views showing name bearing block faces, which are opposite to numeral bearing faces.

Referring in detail to the drawing, to a baseboard 5 is cemented or otherwise secured a preferably wooden, bar 6 into the front side of which has been cut a series of broad recesses 7 between intact ribs 8, said bar occupying only one side portion of said baseboard, leaving a ledge or shelf 9 along that side of the bar which is recessed, as aforesaid, which will be termed the "front" side of the bar. A pin 10 upstands from the back portion of said bar near one of its ends, and a like pin 11 upstands from the opposite end portion of said bar.

The illustrated embodiment of the invention is intended mainly for use in teaching the addition table from two plus two to nine plus nine, and, therefore, requires the use of two four page sheets of problems and answers each of which has inscribed upon each page a column of eight problems. One of these sheets, designated, 15 is shown in the drawing having inscribed upon it the two's to be added, and in part the three's. The complete addition column for "2" is shown in Fig. 1, the order of the sums to be added not increasing in a regular manner, but being "scrambled" so as more efficiently to train the memory. Each of said sheets 15 is of the proper length to fit between the aforesaid pins 10 and 11.

In the right hand portion of Fig. 1 are shown a plurality of answer blocks 16 which are typical of a set of at least fifteen blocks bearing numbers ranging from "4" to "18," and on their opposite faces names of objects and animals. If, for example, the child knows that the sum of two and seven is nine, he will select the block having "9" inscribed upon it and will insert it into the particular recess 7 where it belongs, as indicated by the arrow at the left of said block.

Leftward, as viewed in Fig. 1, of each numerical problem 10 inscribed upon the sheet 15 is an answer designation 17. Normally these answer designations are concealed by a cover strip 18 which is rightangular in cross section, this cover sheet having through each end portion a small hole 20 and spaced inwardly therefrom a hole 21, see Fig. 5, the four holes thus provided being registrable with the aforesaid pins 10 and 11. Said strip 18 also has through it a longitudinally extending series of windows, shown as circular sight openings 23, properly spaced simultaneously to be brought into register with all the aforesaid answer designations 17. In the portion of the cover strip 18 shown in full lines in Fig. 1 said strip has one of its end holes 20 registering with the pin 10 (compared with Fig. 5), the hole 21, farther from the opposite end of said strip registering with the pin 11. Preparatory to shifting the cover strip from this answer covering position of Fig. 1 to the answer revealing position of Figs. 5 and 6, said strip is lifted off from said pins, whereupon it is replaced with its other two holes in register with said pins.

Viewed in its operative position said cover strip 18 has a downwardly directed apron portion 18a (see Fig. 7), which overlies the back of the rightangularly flexed sheet 15 when said sheet is in its operative position.

Each four-page sheet 15 has along its midwidth a flexion line 25 (see Fig. 5) for rightangular bending preparatory to placing the sheet in its mounted position shown in Figs. 1 and 7. When the sheet is so mounted said flexion line is located at the left edge of the top face of the bar 6 and the sheet is nonshiftably held when said cover strip is put into place.

As indicated in Fig. 5 the addition table for the two's is located on one side of the flexion line and the table for the three's on the opposite side thereof. Therefore, in order that the problems read from left to right the three's are inverted in relation to the two's, the sheet 15 being turned end for end when changing from one to the other of these columnar problem tables, which are continued up to nine plus nine.

In Fig. 6 pictures 10a are shown substituted for the numerical problems 10 of Fig. 1, and the names 17a of the objects pictured appearing in the answer column on the sheet 15, the cover strip 18 being adjusted to bring its windows 23 into register with said names. In Figs. 8 and 9 the answer blocks 16 of Fig. 1 are shown inverted to display the names "dog" and "horse" which are the answers opposite to the pictures of these animals shown in Fig. 6. After the child has placed the name bearing blocks alongside the pictures to which he thinks they belong, while the cover strip is positioned to conceal said names, he can then shift the cover strip in the manner already stated to display the true answers so as to check up on the correctness of his work.

The cover strip 18 can be variously constructed without departing from the spirit of the claimed invention. It is evident that said strip might be so mounted as to be moved from the answer concealing position to the answer disclosing position (or vice versa) by means of a simple sliding movement, but it is deemed best not to make said strip transferable from one to the other of said positions in any easier manner than that which has been illustrated and described. Otherwise a child using the device might be overtempted to uncover and inspect the answers before making any effort to recall them to memory.

If desired, the problem-and-answer sheets may be doubled in number and printed on one side only. Then they may each be made in a permanently rightangular cross section, rendering them more durable because of no flexion being necessary.

In Fig. 4 is shown a block 30 of a type having letters or numerals on more than two of its faces. This type of block may be employed in using the device and illustrates how the invention adds to the instructiveness and usefulness of numbered and lettered blocks for children's amusement and instruction.

When the device is used for teaching the multiplication table from two times two to nine times nine thirty-one answer blocks are required to represent all the multiples. For thus teaching multiplication along with the addition which has been described, thirty-six blocks are necessary; and to include the subtraction table with these, forty blocks are required, these numbers of blocks being required when each block used carries an answer numeral on one face only, leaving its other faces for other uses.

I claim:

1. In an educational device of the kind described, a bar horizontally supportable upon an underlying surface, a problem carrying member removably mountable upon said bar in a position wherein it displays a column of problems extending lengthwise of said bar, said bar being marked off longitudinally into a series of sections each of which registers with an individual problem on the mounted problem carrying member, each of said bar sections being dimensioned and positioned to have deposited alongside thereof a block bearing an answer to the problem related to said section, said problem carrying member also having inscribed upon it an answer adjacent to each problem, and a cover normally concealing said answers, said cover being movable to a position wherein it uncovers said answers.

2. In an educational device of the kind described, a bar supportable in a horizontal position in which it has an upper corner portion which is substantially rightangular in cross section, a problem-and-answer strip of sheet material rightangular in cross section and fitted to said corner portion and detachably extending therealong, and a cross sectionally rightangular cover strip having through it windows and mountable upon said bar in an abutting relation to said problem-and-answer strip in two different positions, in one of which it conceals a column of answers to problems on the latter strip and in another of which its said windows afford inspection of said answers, the mounted problem-and-answer strip having upon it a column of problems at all times unobstructed to view by said cover strip, and said bar being marked off longitudinally into sections each of which relates to a said problem and its answer, and juxtaposable to each of which is a block carrying an answer to the corresponding problem.

3. The structure set forth in claim 2 and a plurality of pins upstanding from said bar, said cover strip having through it a plurality of apertures at different points along its length selectively registrable with said pins to hold the bar in place in one position wherein it conceals said answers on said problem-and-answer strip and in another position in which they are visible through said windows.

4. The subject matter of claim 2 and said windows consisting of a longitudinally extending row of openings through the cover strip located at one side of its longitudinally extending rightangular bend.

ALBERT H. MERRILL.

REFERENCES CITED

The following references are of record in the file of this patent:

UNITED STATES PATENTS

| Number | Name | Date |
| --- | --- | --- |
| 163,912 | Birmeli | June 1, 1875 |
| 1,257,655 | Walden | Feb. 26, 1918 |
| 1,629,635 | Parsons | May 24, 1927 |
| 1,656,030 | Waring | Jan. 10, 1928 |
| 1,696,988 | Troidl | Jan. 1, 1929 |